UNITED STATES PATENT OFFICE 2,581,889

METHOD OF PREPARING PYRIMIDO-PYRAZINES

Geoffrey Millward Timmis, London, England, assignor to Burroughs Wellcome & Co. (U. S. A.) Inc., Tuckahoe, N. Y., a corporation of New York No Drawing. Application July 6, 1949, Serial No. 103,319. In Great Britain July 7, 1948

4 Claims. (Cl. 260—251.5)

This invention relates to a novel process for the preparation of 6,7 substituted pyrimidopyrazines of the general formula

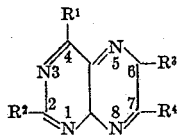

in which $R^1$ and $R^2$ are selected from the class consisting of amino, alkyl, aryl, hydroxy groups and hydrogen, $R^3$ and $R^4$ are selected from the class consisting of alkyl, substituted alkyl, aryl and substituted aryl groups and $R^4$ may also be hydrogen and $R^3$ and $R^4$ may together constitute the elements of a cyclic system represented by the class consisting of the heterocyclic and homocyclic rings. Alternatively $R'$ and $R^2$ may be selected from the class consisting of alkoxy, aryloxy, mercapto, alkylmercapto and arylmercapto, and $R^3$ and $R^4$ may be selected from the class consisting of hydroxy, alkoxy, aryloxy, mercapto, alkylmercapto and arylmercapto groups.

Compounds of the above character are of increasingly greater importance in various therapeutic applications. For example, folic acid having the pyrimidopyrazine nucleus and containing an amino group in the 2-position, a hydroxy group in the 4-position and the side chain

in the 6-position has valuable nutritional properties for the treatment of pernicious anaemia. Other derivatives known to be powerful antagonists to the growth promoting action of folic acid are obtained either by the superficial modification of the folic acid molecule by substituting an amino for a hydroxy group in the 4-position and the addition of a methyl group in the 7-position, for example, or by the introduction of other substituents such as amino groups in the 2- and 4-position and aryl, alkyl, hydrogen and various ring systems in the 6- and 7- positions of the pyrimidopyrazine nucleus. A number of these compounds are useful in the treatment of malignant diseases.

Heretofore the known methods of synthesizing pyrimidopyrazine derivatives have necessitated the condensation of a 5,6-diaminopyrimidine of the formula

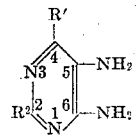

with a selected reagent, resulting in a mixture of isomers conversely substituted at the 6- and 7- positions of the pyrimidopyrazine unless identical substituents happened to be situated at these positions.

It is therefore apparent that by previous methods the location of substituents at the 6- and 7- positions could not be determined in advance by known methods of synthesis. The location of the incoming group is a matter of critical biological importance in many cases and may completely change the pharmacological characteristics of the resulting compound. Thus in the case of folic acid the location of the long side chain at the 7- rather than the 6- position of the pyrimidopyrazine ring produces an isomer which is inactive as a growth producing factor. The desirability of determining the exact position of the entering group by the method of synthesis is accordingly apparent. It is an object of the present invention to provide a process for the preparation of pyrimidopyrazine type derivatives wherein the location of groups entering the nucleus at the 6- and 7- positions can be accurately determined. The new methods achieve this object among others and eliminate the formation of isomers.

Compounds having the above mentioned characteristics are prepared according to the present invention either by the condensation of a 5-nitroso-6-aminopyrimidine with a selected ketone or related compound or by the alternative condensation of the 4-aminopyrimidine with a selected alpha-nitrosoketone or related compound to form the corresponding 6, 7 substituted pyrimidopyrazine as follows:

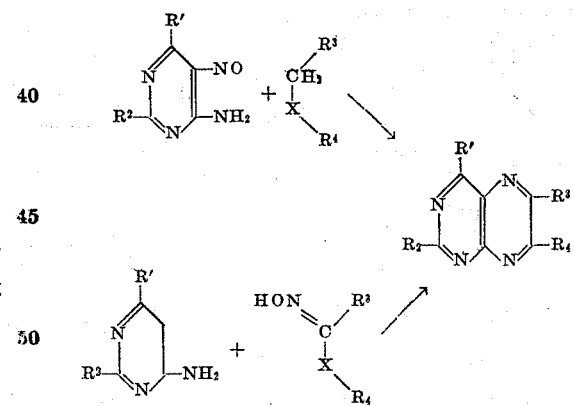

wherein $R'$, $R^2$, $R^3$ and $R^4$ have the above mentioned values. Thus in both cases the pyrazine ring is built onto the pyrimidine ring by an essentially similar condensation with the loss of two molecules of water. The nitroso group involved may be attached initially to either the pyrimidine or the ketone component and these methods may be considered interchangeable as in both cases the position of the entering substituents at the 6- and 7- positions are definitely fixed with relation to the pyrimidopyrazine nucleus.

Preferably, in the above formulae, $R'$ and $R^3$ are selected from the class consisting of amino, alkyl, aryl, hydroxy groups and hydrogen, $R^3$ and $R^4$ are selected from the class consisting of alkyl, substituted alkyl, aryl and substituted aryl groups and $R^4$ may also be hydrogen and $R^3$ and $R^4$ may together constitute the elements of a cyclic system represented by the class consisting of the heterocyclic and homocyclic radicals and X is selected from the class consisting of the carbonyl, thiocarbonyl, acetal, ketal and thioketal groups. The location of the nitroso group may be generalized in the above formula by using the symbols Y and Y' respectively at the 5- position of the pyrimidine ring and on the condensing carbon of the ketone or similar derivative wherein one of the symbols Y and Y' constitutes the nitroso grouping. For purposes of the present invention the nitroso and isonitroso groups are regarded as equivalents.

An essential feature is the employment of a compound comprising the grouping —CH₂—X— containing a suitably activated methylene group, or the derived —C(=NOH)—X— grouping. The obvious tautomeric variants are to be regarded as included in the above description. The reaction usually goes well in the presence of an acid catalyst or in acetic acid solution at temperatures of 100°–200° C., although a solvent or catalyst is not always essential. Sometimes, however, the nature of the substituents $R^3$ and $R^4$ or the stability of the nitroso reactant employed may render desirable, for example, the use of an alkaline catalyst in an appropriate solvent, as exemplified by the procedures set forth in Examples 4 and 5, wherein a basic catalyst is formed by the reaction of sodium carbonate in acetic acid to form sodium acetate, and such modified reaction conditions are not excluded from the scope of our invention.

As will be seen from the following Examples 2 and 3 the present method allows the unambiguous preparation of isomeric compounds as desired.

Similarly 5-nitroso-4-hydroxy-2,6-diaminopyrimidine may be reacted with p(gamma-oxopropylamino)benzoyl glutamic acid

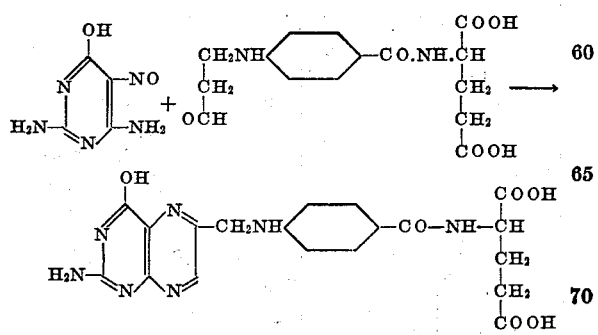

to provide an unambiguous synthesis of folic acid whereas minor alterations such as use of the gamma-oxobutylamino derivative afford related compounds capable of acting as antagonists to folic acid.

In addition to the advantages mentioned above, the present invention lessens the number of stages required to synthesize certain pyrimidopyrazine derivatives, as compared with the previously known methods of synthesis.

Our invention will be more clearly understood from consideration of the following illustrative examples.

EXAMPLE 1

Preparation of 2,4-diamino-6,7-diphenylpyrimidopyrazine

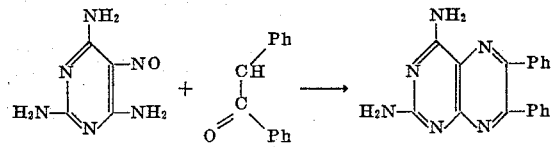

5-nitroso-2,4,6-triaminopyrimidine (2 g.) and desoxybenzoin (4 g.) were heated together in glacial acetic acid (60 cc.) containing 1 drop of concentrated hydrochloric acid for 9 hours at 150–160° C. After cooling and standing the mixture was filtered from yellow insoluble material and the filtrate diluted with a mixture of water (250 cc.) and 2N hydrochloric acid (20 cc.). The mixture was shaken twice with ether (50 cc.) and then with light petroleum (50 cc.) in order to remove unchanged desoxybenzoin and some impurities. The solution was made alkaline by the addition of concentrated aqueous ammonia solution and the resultant precipitate filtered off and dissolved in 5% aqueous formic acid (150 cc.). After warming with charcoal and filtering the solution was made alkaline with ammonia and the yellow precipitate filtered off, washed with water and methanol, and dried. The product (1.1 g.) was substantially pure 2,4-diamino-6,7-diphenylpyrimidopyrazine and melted at 280° C. After recrystallization from 50% aqueous formic acid the pure compound was obtained, melting at 282°, identical in all respects with the product obtained by the method of Mallette and others (Journal of the American Chemical Society, 1947, Volume 69, page 1814) including the absorption spectrum in ultra violet light.

By the same procedure 2,4,6-triamino-5-nitrosopyrimidine was reacted with indoxyl

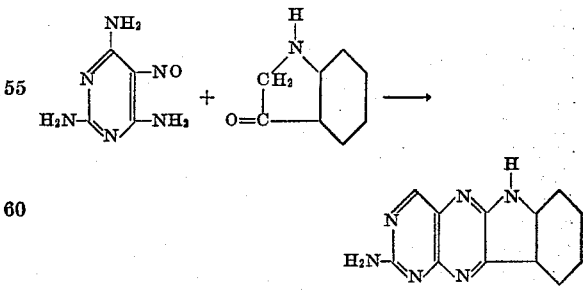

to give 2,4-diamino-6,7-indolopyrimidopyrazine melting not under 350° C.

A similar method was followed in reacting 2,4,6-triamino-5-nitrosopyrimidine with cyclohexanone

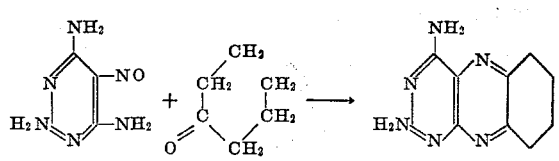

to give 2,4-diamino-6,7-tetramethylenepyrimidopyrazine.

EXAMPLE 2

*The preparation of 2,4-diamino-6-phenyl-7-methylpyrimidopyrazine*

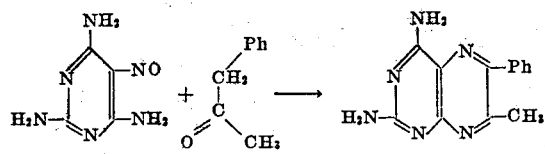

5-Nitroso-2,4,6-triaminopyrimidine (2.1 g.), benzylmethylketone (10 cc.), concentrated hydrochloric acid (2 drops) and glacial acetic acid (100 cc.) were heated together at 150–160° C. for 10 hours. After cooling the small dark-brown precipitate was filtered off and discarded and the filtrate evaporated under reduced pressure to 30 cc. After dilution to 250 cc. with water and 2N-hydrochloric acid (20 cc.) impurities and benzylmethylketone were removed by shaking with ether (100 cc. and 50 cc.) and light petroleum (50 cc.). Sodium chloride (5 g.) was added to the solution and it was made alkaline with concentrated aqueous ammonia solution. The light-brown precipitate was filtered off, dissolved in 5% formic acid (150 cc.), warmed with charcoal (0.2 g.), filtered, cooled and the filtrate made alkaline with ammonia. The precipitate was again dissolved in hot 5% formic acid, treated with charcoal, filtered, cooled and made alkaline with ammonia. The precipitate, semi-crystalline and of a light buff-brown color, weighed 0.75 g. and was substantially pure 2,4-diamino-6-methyl-7-phenylpyrimidopyrazine, melting point 328–330°. A further 0.15 g. of similar material was recovered from the ammoniacal mother liquors by evaporating until there was no further precipitation, filtering off the buff-colored precipitate, triturating thoroughly with one-quarter N sodium hydroxide solution, filtering and washing with water. Final purification of the nearly pure material was effected by triturating with concentrated hydrochloric acid (13 cc. to 1 g.), filtering off the hydrochloride, washing it with concentrated hydrochloric acid and converting to base by trituration with aqueous ammonia solution. Recrystallization from 20% formic acid yielded very light buff-yellow colored needles of the pure material, melting at 332° C.

EXAMPLE 3

*Preparation of 2,4-diamino-6-methyl-7-phenyl pyrimidopyrazine*

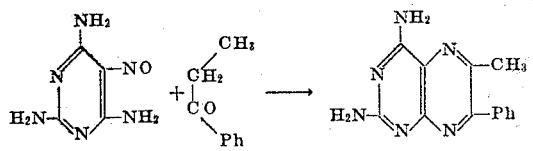

5-nitroso-2,4,6-triaminopyrimidine (2.1 g.) propiophenone (10 cc.), concentrated hydrochloric acid (2 drops) glacial acetic acid (100 cc.) were heated together at 150–160° for 10 hours and worked up by the method of Example 2. The product was identified as 2,4-diamino-6-methyl-7-phenyl pyrimidopyrazine melting at 332° C.

EXAMPLE 4

*Preparation of 2,4-diamino-6,8-dihydroxypyrimidopyrazine (6,7,5',4') pyrimidine. (First method)*

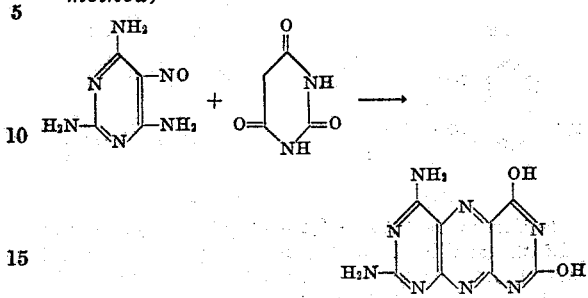

In this and following examples where a pyrimidine ring satisfies the substitution in the 6-and 7-positions of the pyrimidopyrazine nucleus the nomenclature is based on the following structural formula

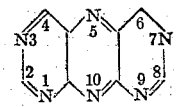

5-Nitroso-2,4,6-triaminopyrimidine (1.1 g.), barbituric acid (0.9 g.), anhydrous sodium carbonate (0.8 g.) and glacial acetic acid (50 cc.) were mixed and boiled under reflux for 3¼ hours. After cooling and filtering the precipitate was washed with acetic acid and hot water and finally with methanol. It was then warmed with 100% formic acid (30 cc.) on the steam bath, charcoal added and the mixture filtered. The clear filtrate was mixed at the boil with water (200 cc.) and cooled, yielding a light yellow semi-crystalline precipitate of the substantially pure material which, after washing with methanol, weighed 0.8 g. It was obtained completely pure in yellow microneedles by again dissolving in hot 100% formic acid and adding water at the boil.

EXAMPLE 5

*Preparation of 2,4-diamino-6,8-dihydroxypyrimidopyrazine (6,7,5',4') pyrimidine. (Second method)*

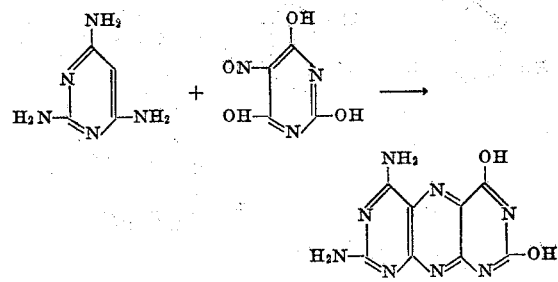

2,4,6-triaminopyrimidine (0.9 g.), anhydrous sodium carbonate (0.8 g.), 5-nitroso-2,4,6-trihydroxypyrimidine and glacial acetic acid (55 cc.) were mixed and boiled under reflux for 6 hours. After cooling, the precipitate was filtered off, washed with acetic acid, boiling water and methanol, heated on the steam-bath with 100% formic acid (15 cc.), treated with charcoal, filtered and the filtrate treated with hot water (200 cc.) to yield a semi-crystalline precipitate which, after washing with water and methanol, weighed 0.4 g. It was the substantially pure product and after recrystallization yielded yellow micro-needles, identical in properties with the product obtained by the method described in Example 4.

EXAMPLE 6

*Preparation of 2,4,6,8-tetrahydroxypyrimidino-pyrazino-(6,7:5',4')pyrimidine. (First method)*

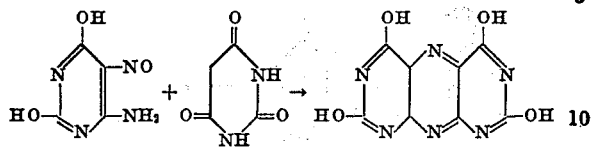

5-nitroso-6-amino - 2,4 - dihydroxypyrimidine (1.6 g.) and barbituric acid (2.1 g.) were mixed with glacial acetic acid (75 cc.) and concentrated hydrochloric acid (1 drop) and the mixture boiled for 2½ hours under reflux. After cooling, filtering and washing the precipitate with acetic acid and methanol, 2.75 g. of a light-brown solid was obtained. The crude product was purified by warming with a mixture of water (500 cc.) and concentrated aqueous ammonia (50 cc.), collecting the ammonium salt, washing it with 2N aqueous ammonia solution, converting it to the parent substance by treatment with water (100 cc.) and acetic acid and finally dissolving the product in 10% aqueous triethanolamine solution, treating the solution with charcoal, filtering and acidifying the filtrate with acetic acid. The process was repeated and yielded the pure substance in light buff-colored micro-needles (yield 1 g.). The substance does not melt below 350° C. It yields sparingly soluble salts with dilute aqueous sodium hydroxide, potassium hydroxide and ammonia solutions.

The solution of this substance in dilute alkalies shows an intense blue-violet fluorescence in ultra violet light.

EXAMPLE 7

*Preparation of 2,4,6,8-tetrahydroxypyrimidino-pyrazino - (6,7:5',4')pyrimidine. (Second method)*

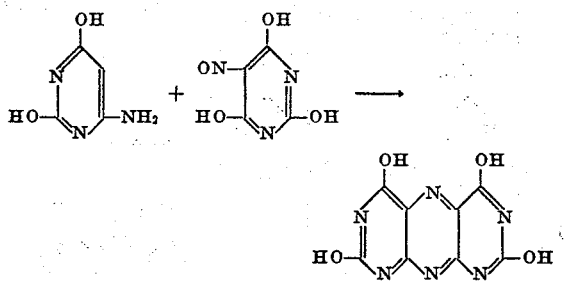

5-nitroso-2,4,6-trihydroxypyrimidine (1.5 g.), 6-amino-2,4-dihydroxypyrimidine (1.2 g.), glacial acetic acid (75 cc.) and concentrated hydrochloric acid (1 drop) were mixed and boiled under reflux for 3 hours. After cooling, filtering and washing the precipitate with acetic acid, water and methanol, a light buff-colored solid (0.9 g.) was obtained. A further 0.2 g. of similar material was obtained by evaporating the mother liquors to dryness and washing the residue with hot water and methanol. The crude material was purified by the method used in the previous example and yielded light buff-colored micro-needles; yield 0.8 g. The properties and the absorption spectrum in ultra violet light were identical with those for the product of Example 6.

EXAMPLE 8

*Preparation of 8-amino-2,4,6-trihydroxy-pyrimidopyrazine (6,7,5',4')pyrimidine*

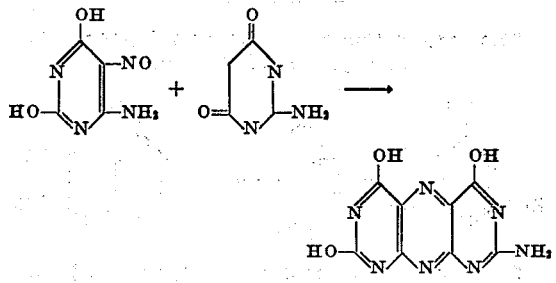

A similar procedure to that of Example 4 was employed using 5 - nitroso - 6 - amino-2,4-dihydroxypyrimidine and malonyl guanidine to prepare the above compound which melted not over 350° C.

EXAMPLE 9

*Preparation of 1,3,7,9-tetramethyl-2,4,6,8-tetraketo-1,2,3,4,6,7,8,9-octahydropyrimidopyrazino-(6,7,5',4')-pyrimidine. (First method)*

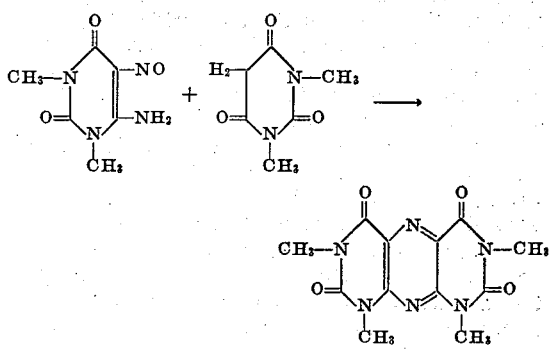

5-nitroso-6-amino-1,3 - dimethyl - 2,4 - diketo-1,2,3,4-tetrahydropyrimidine (0.9 g.) and 1,3-dimethyl - 2,4,6 - triketohexahydropyrimidine (0.9 g.) were finely powdered and boiled under reflux with glacial acetic acid (15 cc.) for 30 minutes. After cooling, filtering and washing with glacial acetic acid and methanol the pure product (0.85 g.) was obtained in very light yellow needles, m. p. 403° C. The melting point depends on the rate of heating.

EXAMPLE 10

*Preparation of 1,3,7,9-tetramethyl-2,4,6,8-tetraketo-1,2,3,4,6,7,8,9-octahydropyrimidopyrazino-(7,7,5',4')-pyrimidine. (Second method)*

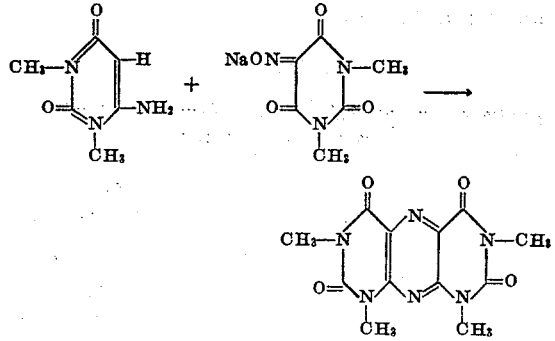

6 - amino-1,3-dimethyl-2,4-diketo-1,2,3,4-tetrahydropyrimidine (0.25 g.) and the sodium salt of 5 - isonitroso-1,3-dimethyl-2,4,6-triketohexahydropyrimidine (0.27 g.) were mixed and boiled under reflux with glacial acetic acid (10 cc.) for 30 minutes. After concentrating to 4 cc., cooling, filtering and washing with glacial acetic acid and methanol the product was obtained in light yellow needles (0.25 g.) which were recrystallized by dissolution in 98% formic acid and addition of water. The product had the same melting point as the product of Example 9 and a mixture of the two substances.

The following derivatives were prepared by similar procedures in the indicated manner:

1. 2,4-diamino-6-hydroxy-7-carbonylurea-pyrimidopyrazine (melting not under 350° C.).

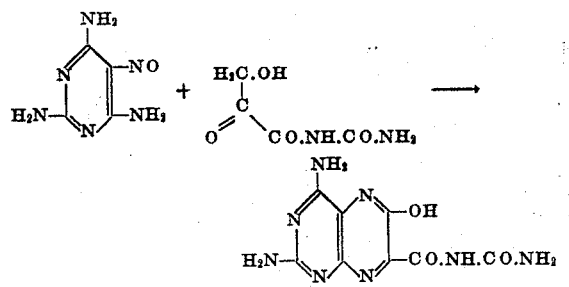

2. 2,4,6-trihydroxy-7-carbonylurea - pyrimidopyrazine (melting not under 350° C.).

3. 2,4-dihydroxy-6,7-(m-aminophenyl)-pyrimidopyrazine (melting not under 300° C.).

4. 2-methyl-4-phenyl-6,8-diketo-6,7,8,9-tetrahydropyrimidopyrazino - (6,7,5',4') - pyrimidine was prepared by reacting 2-methyl, 4-phenyl, 6-aminopyrimidine with 5-isonitroso barbituric acid by the method of Example 10 represented as follows:

5. 2-phenyl, 2-methyl, 6,8-diketo-6,7,8,9-tetrahydropyrimidopyrazino- (6,7,5',4') - pyrimidine was prepared by reacting 2-phenyl-4-methyl-6-aminopyrimidine and 5-isonitroso barbituric acid by the method of Example 10 as represented by the following:

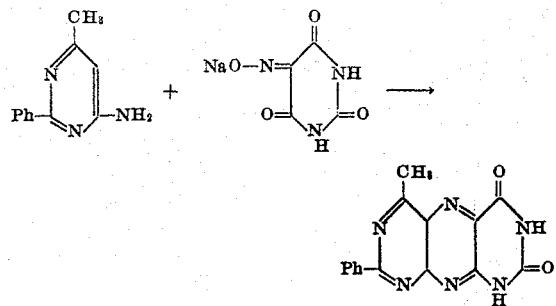

I claim:
1. The process of preparing pyrimidopyrazine derivatives of the type represented by the formula wherein R' and R² are selected from the class consisting of amino, alkyl, aryl and hydroxy groups and hydrogen, R₃ and R₄ are selected from the class consisting of alkyl, and aryl groups and R₃ and R₄ may together constitute the elements of a cyclic system represented by the class consisting of the heterocyclic and homocyclic radicals, which process comprises reacting a pyrimidine with a reactant containing a carbonyl group of the following formula wherein R', R², R³ and R⁴ have the above identified values.

2. The process of claim 1 wherein the reaction is carried out in the presence of an acid catalyst.
3. The process of claim 1 wherein the reaction is carried out in the presence of an acid catalyst within the temperature range of from 100° to 200° C.
4. The process of claim 1 wherein the reaction is carried out in the presence of a basic catalyst.

GEOFFREY MILLWARD TIMMIS.

No references cited.